United States Patent
Okada

[11] Patent Number: 6,039,826
[45] Date of Patent: Mar. 21, 2000

[54] METHOD OF FORMING GREEN TIRE WITH STRIP WINDING

[75] Inventor: Noboru Okada, Hiratsuka, Japan

[73] Assignee: The Yokohama Rubber Co., Ltd., Tokyo, Japan

[21] Appl. No.: 09/061,073

[22] Filed: Apr. 16, 1998

[30] Foreign Application Priority Data

Apr. 22, 1997 [JP] Japan ................................. 9-104836
Apr. 23, 1997 [JP] Japan ................................. 9-106206

[51] Int. Cl.⁷ ........................................... B29D 30/60
[52] U.S. Cl. ..................... 156/117; 156/130; 156/397
[58] Field of Search ................................. 156/117, 397, 156/130, 96, 111, 405.1

[56] References Cited

U.S. PATENT DOCUMENTS

| | | | |
|---|---|---|---|
| Re. 25,349 | 3/1963 | Hanson | 156/117 |
| 3,170,499 | 2/1965 | Deist | 156/397 |
| 3,177,918 | 4/1965 | Holman | 156/117 |
| 3,251,722 | 5/1966 | Holman | 156/130 |
| 3,837,967 | 9/1974 | Symons | 156/397 |
| 4,170,504 | 10/1979 | Riggs | 156/397 |
| 4,240,863 | 12/1980 | Vinton | 156/130 |
| 4,352,467 | 10/1982 | Dunn et al. | 242/55 |

*Primary Examiner*—Geoffrey L. Knable
*Attorney, Agent, or Firm*—Nikaido, Marmelstein, Murray & Oram LLP

[57] ABSTRACT

A method of forming a green tire according to the present invention comprises winding a rubber strip on an adjusting drum while extruding an unvulcanized rubber from an extruder in a form of the rubber strip in a length corresponding to the rubber quantity of a tire constituent portion, and forming the tire constituent portion by winding said rubber strip continuously a plurality of times on the outer circumference of a rotary support member, unwinding it from the adjusting drum.

9 Claims, 9 Drawing Sheets

METHOD OF FORMING GREEN TIRE WITH STRIP WINDING

BACKGROUND OF THE INVENTION

This invention relates to a method of forming a green tire. More particularly, the present invention relates to a method of forming a green tire which makes it possible to shape tire constituent portions with high dimensional accuracy while keeping high productivity by a strip winding method.

Pneumatic tires in general are produced by fitting a green tire shaped into substantially the same structure and size as those of complete tires and from an unvulcanized rubber into a mold and vulcanizing and molding the green tire. Tire constituent portions of such a green tire, such as a cap tread, a side tread, etc, are formed by winding a rubber sheet material having a shape similar to the cross-sectional shape of each tire constituent portion in a length corresponding to the tire peripheral length, and splicing both end portions of the rubber sheet material. In the pneumatic tires produced by this splicing method of the rubber sheet material, however, the splicing portion remains as a step and invites the problem of tire uniformity.

In contrast with such a splicing method, a so-called "strip winding method" is known which comprises the steps of extruding the unvulcanized rubber in a thin strip from an extruder, winding continuously a plurality of times the rubber strip round a tire intermediate body and shaping the overall sectional shape so integrated into the shape corresponding to that of the tire constituent portion. Since this strip winding method does not yield the splicing portion, a pneumatic tire having high uniformity can be obtained. Further, because a tire constituent portion having a predetermined size can be shaped by merely winding the rubber strip in layers, productivity is high. Moreover, because the strip winding method does not need expensive mouthpieces the splicing method need to prepare for each rubber sheet material, it can be said very advantageous from the aspect of the production cost.

Notwithstanding these advantages, the strip winding method is not free from the drawback that tire dimensional accuracy cannot be improved because an extrusion speed is difficult to control when the rubber strip is continuously extruded from an extruder. In other words, when the tire constituent portion is molded by winding the rubber strip in layers in this strip winding method, the peripheral speed increases as the outer peripheral diameter grows, and it is difficult to let the extrusion speed of the rubber strip of the extruder quickly follow the increase of this peripheral speed. Because the extrusion quantity gets unstable particularly at the start and end of extrusion, it is difficult to stably feed the rubber strip in a correct quantity in synchronism with the rotation of the building drum.

SUMMARY OF THE INVENTION

It is an object of the present invention to provide a method of forming a green tire which makes it possible to shape a tire constituent portion with high dimensional accuracy without impeding high productivity of a strip winding method.

To accomplish this object, the present invention provides a method of forming a green tire which comprises winding on an adjusting drum a rubber strip made of unvulcanized rubber extruded from an extruder in a length corresponding to the rubber quantity of a tire constituent portion and forming the tire constituent portion by continuously winding a plurality of times the rubber strip on the outer circumference of a rotary support member while unwinding the rubber strip from the adjusting drum onto the rotary support member.

As described above, in the present invention the rubber strip extruded from the extruder is not directly wound on the outer circumference of the rotary support member but is wound temporarily on the adjusting drum in the rubber quantity necessary for the tire constituent portion and then is wound on the outer circumference of the rotary support member to form the tire constituent portion. Therefore, the extrusion speed from the extruder and the winding speed on the rotary support member need not at all be synchronized with each other. In other words, even when the extrusion quantity fluctuates particularly at the start and end of extrusion, the fluctuation quantity of the rubber strip wound on the adjusting drum is known in advance and the adjusting drum and the rotary support member can be synchronously rotated in accordance with this fluctuation quantity. Even when the peripheral speed increases with the growth of the outer peripheral diameter when the tire constituent portion is formed by winding the rubber strip in layers, the rubber strip can be wound in such a manner as to easily follow the peripheral speed. Consequently, the tire constituent portion having high dimensional accuracy can be produced without impeding high productivity of the strip winding method.

BRIEF DESCRIPTION OF THE DRAWINGS

FIG. 2b is a sectional view of principal portions showing the side tread on the right side formed in FIG. 2a;

FIG. 3b is a sectional view of principal portions showing the rim cushion on the right side formed in FIG. 3a;

FIG. 4b is a sectional view of principal portions showing the bead filler on the right side formed in FIG. 4a;

FIG. 5b is a semi-sectional view showing the under-tread formed in FIG. 5a;

FIG. 6b is a semi-sectional view showing the cap tread shaped in FIG. 6a;

DETAILED DESCRIPTION OF THE PREFERRED EMBODIMENTS

Figure 1A:
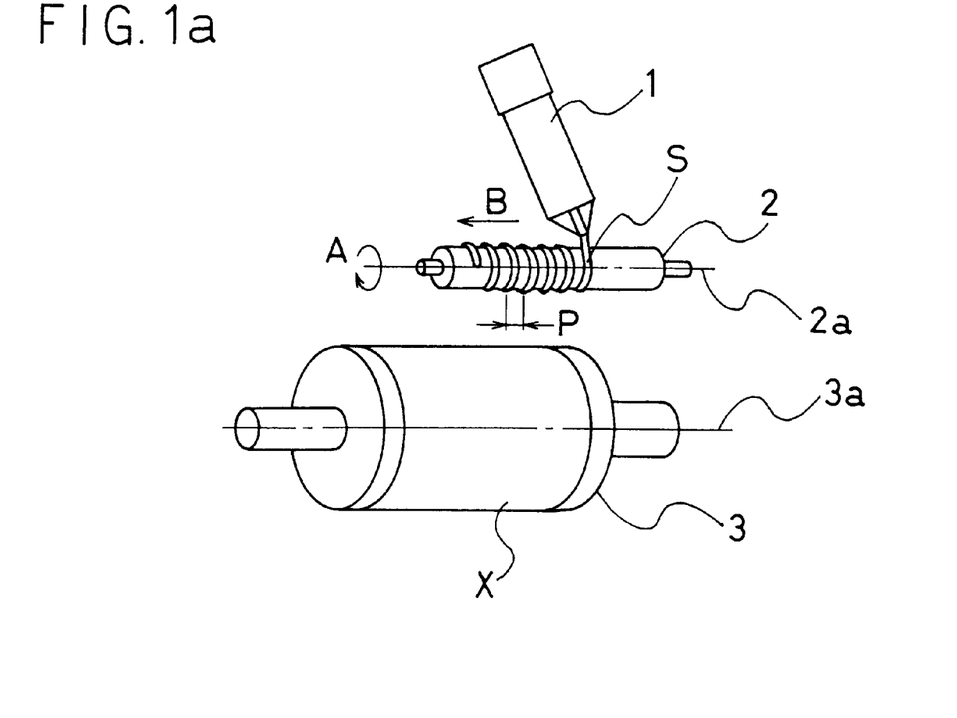
FIG. 1a is a perspective explanatory view showing the step of winding a unvulcanized (green) rubber strip extruded from an extruder onto an adjusting drum in a forming method of a green tire according to the present invention.
Figure 1B:
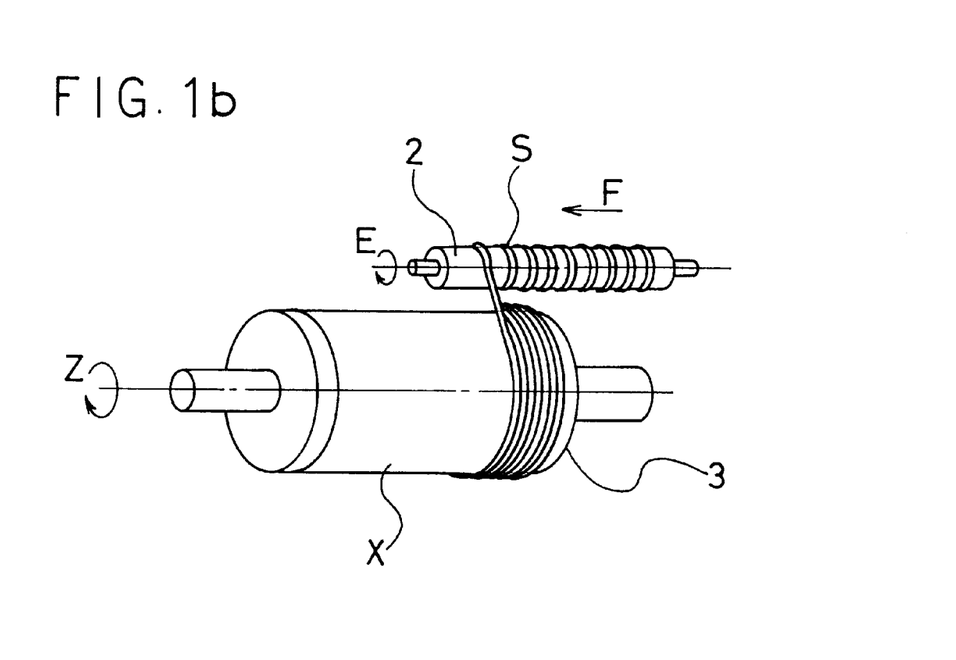
FIG. 1b is a perspective explanatory view showing the step of winding back the rubber strip wound in FIG. 1a from the adjusting drum and winding it onto a tire intermediate body.

Referring initially to FIGS. 1a and 1b, reference numeral 1 denotes an extruder for continuously extruding an unvulcanized rubber strip (green rubber strip) S, reference numeral 2 denotes an adjusting drum so driven for rotation as to wind the rubber strip S and reference numeral 3 denotes a building drum (rotary support member) so driven for rotation as to form a precursor of a green tire. The adjusting drum 2 and the building drum 3 are positioned to oppose each other so that their rotary shafts 2a and 3a are in parallel with each other. The adjusting drum 2 is shaped into a straight cylinder having the same diameter in the direction of its rotary shaft 2a and is capable of reciprocating in both of the direction of the rotary shaft 2a and in the approaching/departing direction to and from the building drum 3.

According to the present invention, the unvulcanized rubber is extruded from the extruder 1 as the continuous rubber strip S, and this rubber strip S is then wound spirally on the adjusting drum 2 (FIG. 1a) by turning the adjusting drum 2 in the direction of an arrow A at a constant speed and moving it in the direction of an arrow B at a constant speed. In this instance, the rubber strip S is extruded from the extruder 1 in the quantity corresponding to the rubber quantity of the tire constituent portion used for one green tire. When taken up onto the adjusting drum 2, the rubber strip S is preferably wound up while being spaced apart at a constant pitch P lest each rubber strip S overlaps with one another. When the rubber strip S overlaps, it adheres with one another and a trouble occurs during unwinding.

After takeup is completed, the adjusting drum 2 is advanced to the winding position. The end portion of the rubber strip S which is unwound is pressed and bonded to the tire intermediate body X that has been already been shaped on the building drum 3.

Subsequently, the building drum 3 and the adjusting drum 2 are synchronously rotated in the directions indicated by arrows Z and E, respectively, in accordance with the extrusion quantity of the rubber strip S as shown in FIG. 1b and the adjusting drum 2 is moved in the direction F of the axis of rotation. In consequence, the rubber strip S is rewound from the adjusting drum 2 and is wound stably and continuously in the correct rubber quantity on the tire intermediate body X. The rubber strip S is wound a plurality of times while its width is being deviated in such a manner as to superpose the strip S, whenever necessary, thereby forming the tire constituent portion. At this time, the adjusting drum 2 is preferably moved so that the rubber strip S is always wound from a direction substantially orthogonal to the axis of rotation 3a of the building drum 3 in order to keep the tension of the rubber strip S wound on the adjusting drum 2 constant. The adjusting drum 2 is moved only in the direction F of the axis of rotation or is reciprocated in accordance with the tire constituent portion which is formed.

In order to have the method of the present invention more easily understood, FIGS. 1a and 1b show the case where the rubber strip S is wound on the sheet-like tire intermediate body X formed on the building drum 3 to shape the tire constituent portion, by way of example. Preferred examples of the tire constituent portions in the present invention include a cap tread, an under-tread, a side tread, a bead filler, a rim cushion, and so forth. The tire constituent portions may be formed by directly winding the rubber strip S on the building drum 3 depending on the tire constituent portion which is to be formed. An example of forming of the tire constituent portions in the tire forming process will be given next. Incidentally, the process steps for molding only the tire constituent portions on the right side will be illustrated in enlarged sectional views so as to have the construction more easily understood in the drawings, but the tire constituent portions on the left side are also constituted in the same way.

Figure 2A:
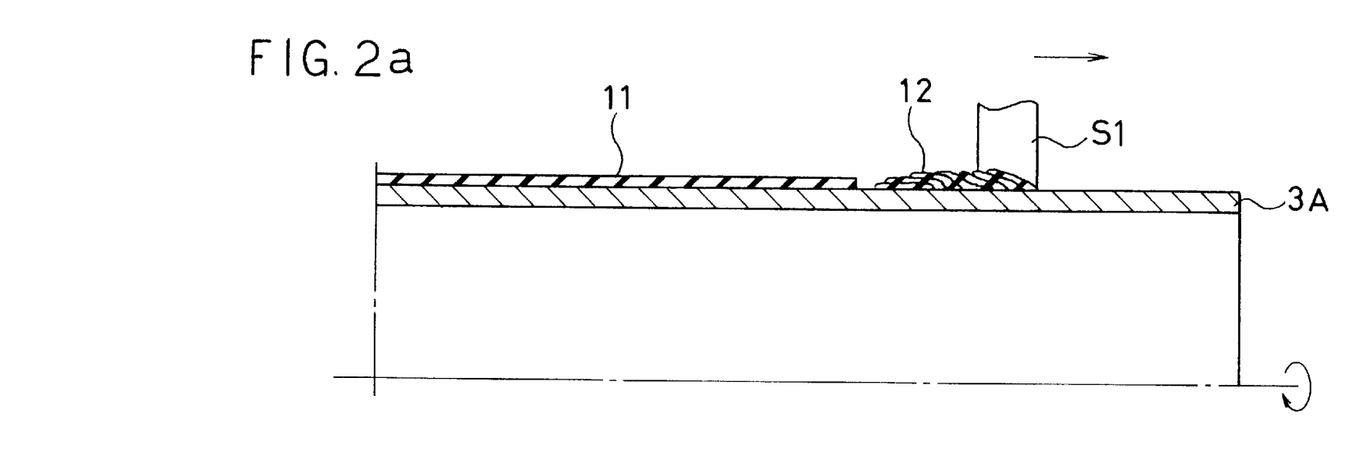
FIG. 2a is a sectional view of principal portions showing the step of shaping a side tread on the right side as one of the tire constituent portions.
Figure 2B:
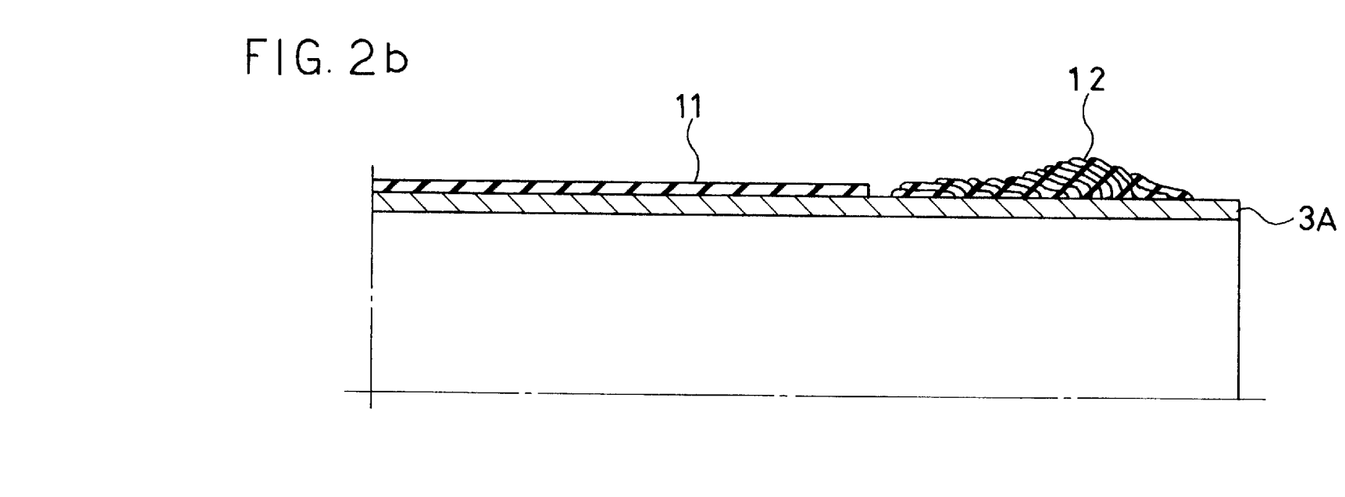

FIG. 2a shows a step of shaping a side tread. The rubber strip S1 is unwound from the adjusting drum and wound a plurality of times onto a position of the building drum (band drum) 3A next to the right end of a cylindrical inner liner 11 wound on the building drum 3A while the adjusting drum is moved in the direction of the arrow and the building drum 3A rotates synchronously, as described above, to form the side tread 12 on the right side. FIG. 2b shows the side tread 12 so shaped.

Figure 3A:
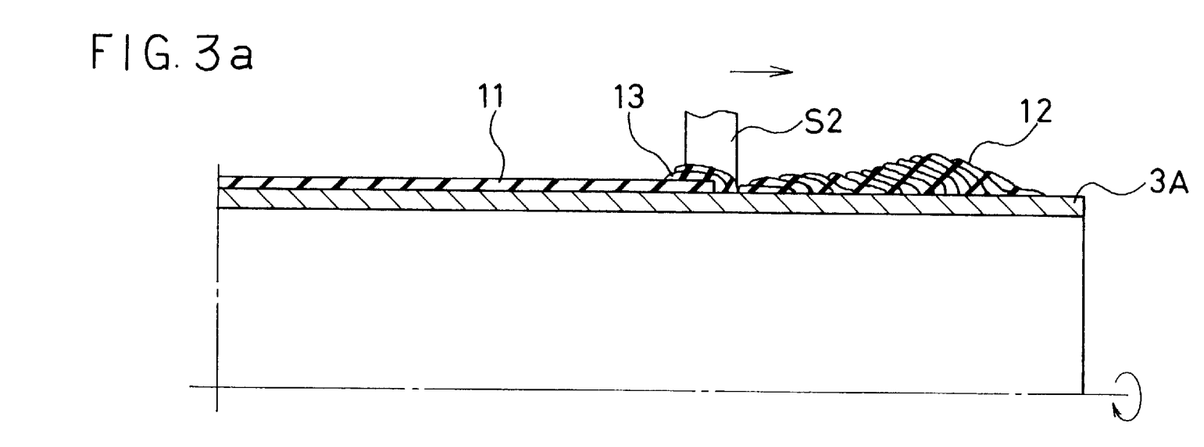
FIG. 3a is a sectional view of principal portions showing the step of shaping a rim cushion on the right side as one of the tire constituent portions.
Figure 3B:
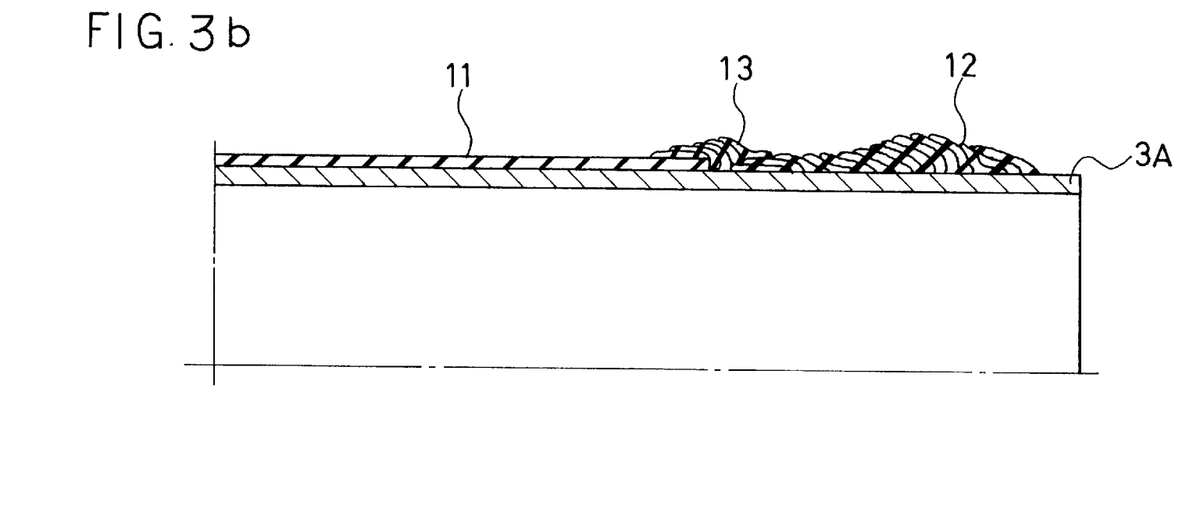

FIG. 3a shows a step of forming a rim cushion which is carried out in succession to the step shown in FIG. 2a. As described above, the rubber strip S2 is unwound from the adjusting drum and wound a plurality of times from the right end portion of the inner line 11 on the building drum 3A rotating synchronously to the inner end portion of the side tread 12 while the adjusting drum is moved in the direction of the arrow, to form the rim cushion 13 on the right side. FIG. 3b shows the rim cushion 13 so shaped.

Figure 4A:
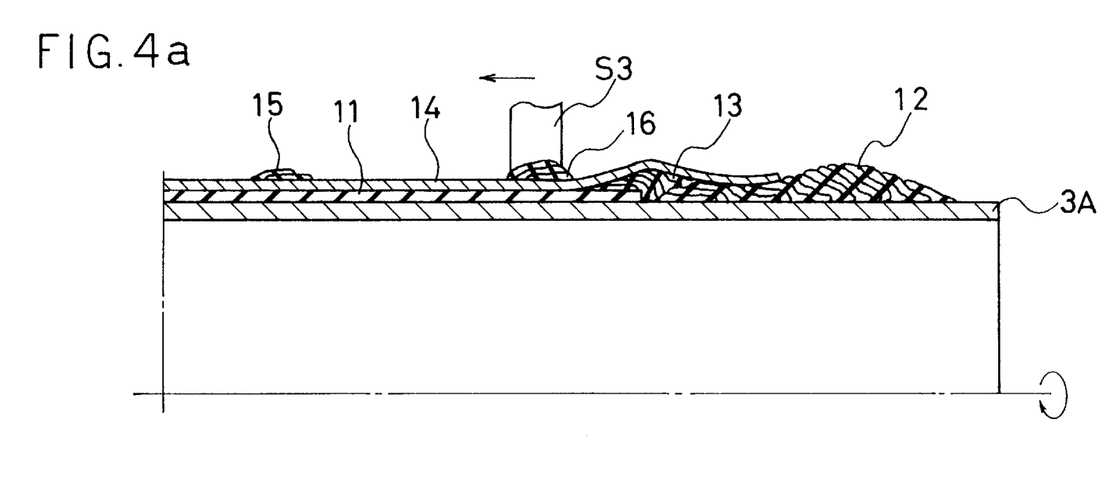
FIG. 4a is a sectional view of principal portions showing the step of shaping a bead filler on the right side as one of the tire constituent portions.
Figure 4B:
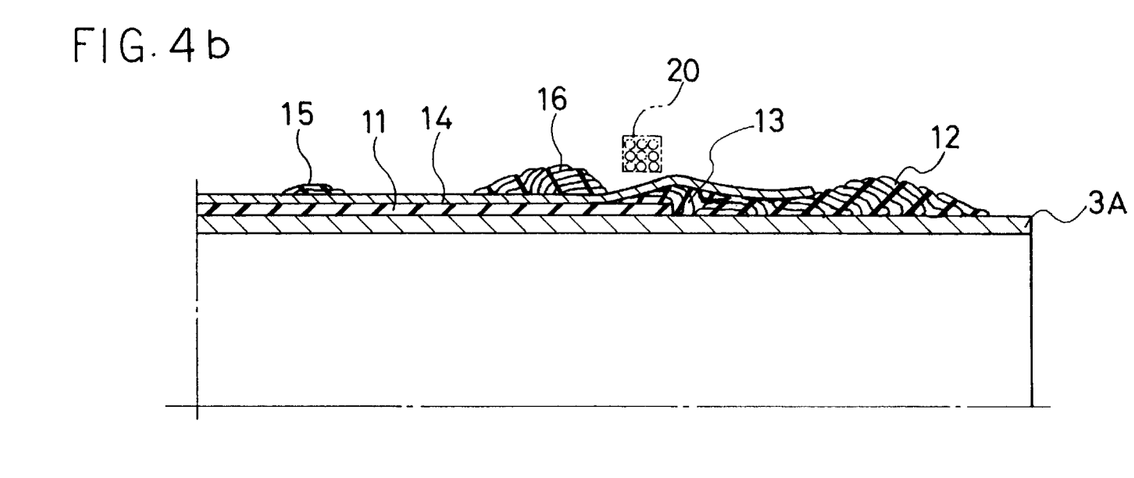

FIG. 4a shows a step of forming a bead filler which is carried out after a carcass layer 14 and a belt edge cushion 15 on the right side are wound on the shaped body. The rubber strip S3 is unwound from the adjusting drum and wound a plurality of times on the outer circumferential side of the carcass layer 14 on the building drum 3A rotating synchronously, to form the bead filler 16 on the right side while the adjusting drum is moved in the direction of the arrow. FIG. 4b shows the bead filler 16 so shaped. Incidentally, though the drawings shows the case where the belt edge cushion 15, too, is formed by winding the rubber strip S, this belt edge cushion 15 may be shaped by winding a common rubber sheet material because the winding rubber quantity does not greatly change even when a tire size is changed.

Figure 5A:
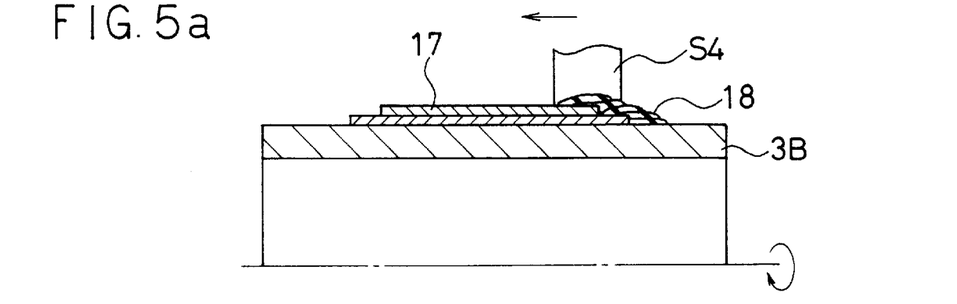
FIG. 5a is a semi-sectional view showing the step of shaping an under-tread as one of the tire constituent portions.
Figure 5B:
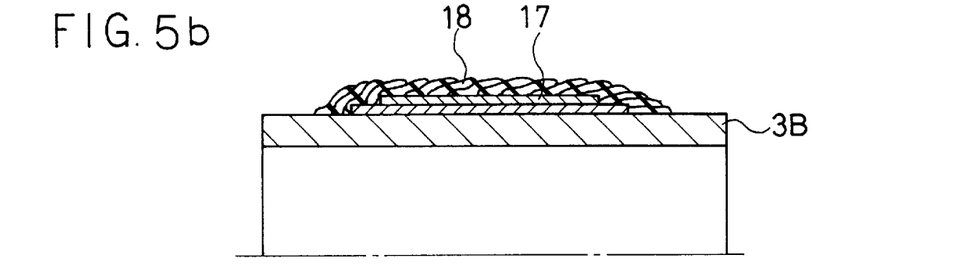

FIG. 5a shows a step of forming an under-tread. The rubber strip S1 is unwound from the adjusting drum and wound a plurality of times on the belt layer 17 wound on the building drum (belt drum) 3B to shape the under-tread 18 while the adjusting drum is moved in the direction of the arrow and the building drum 3B rotates synchronously. FIG. 5b shows the under-tread 18 so shaped.

Figure 6A:
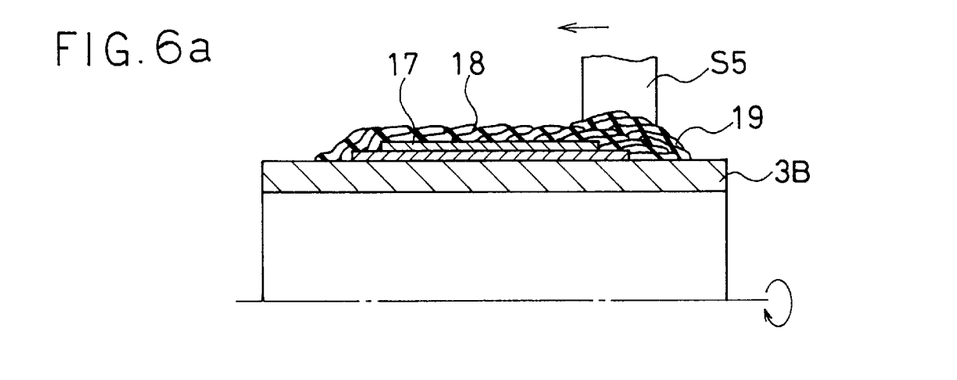
FIG. 6a is a semi-sectional view showing the step of forming a cap tread as one of the tire constituent portions.
Figure 6B:
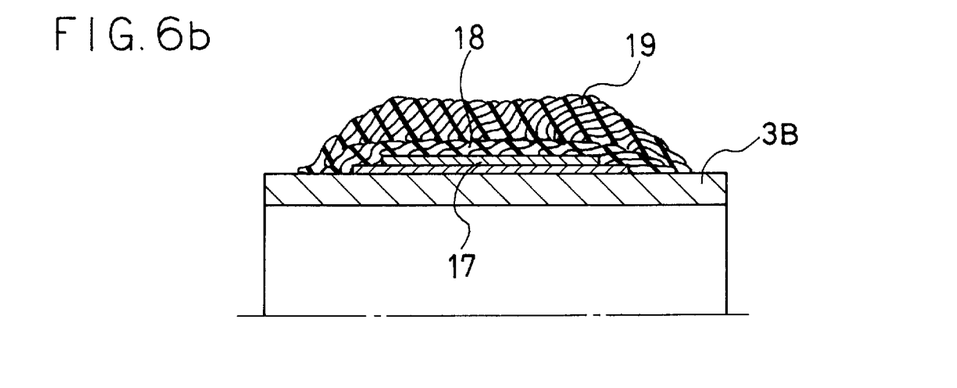

FIG. 6a shows a step of forming a cap tread which is carried out in succession to the step shown in FIG. 5a. The rubber strip S5 is unwound from the adjusting drum 4 and wound a plurality of times onto the undertread 18 on the building drum 3B while the adjusting drum is moved in the direction indicated by the arrow the building drum 3B rotates synchronously, thereby forming the cap tread 19. FIG. 6b shows the cap tread 19 so shaped.

The shaped body which is formed at the band drum 3A is mounted to a shaping drum, not shown, with the bead core 20 which is supplied, where both end portions of the carcass layer are turned up round the bear core 20 with the right and left side treads 12, then shaped into a troidal shape by a bladder, and pressed-bonded to the inner circumferential side of the shaped body formed at the belt drum 3B which is transferred to the outer circumferential side of the shaping drum, and they are shaped into the green tire.

As described above, the rubber strip S extruded from the extruder 1 in the present invention is not directly supplied onto the building drum 3 but is temporarily wound on the adjusting drum 2 and is then wound on the building drum 3 or on the tire intermediate body X to thereby form the tire constituent portion. Therefore, since the quantity of variance of the rubber strip S wound on the adjusting drum 2 is known in advance even when the extrusion quantity changes particularly at the initial stage and the final stage of extrusion of the extruder 1, the adjusting drum 2 and the building drum 3 can be easily rotated synchronously in such a manner as to follow such a change. When the rubber strip S is wound in layers so as to form a tire constituent portion the outer circumferential diameter of which grows increasingly, too, the rubber strip S can be easily wound in such a manner as to follow the peripheral speed. As a result, each tire constituent portion can be formed with high dimensional accuracy while keeping high productivity by the strip winding method.

If the rubber strip S is wound in advance on the adjusting drum 2, the speed of forming the tire constituent portions is not at all affected by the extruding speed of the extruder 1. Therefore, the high production cycle can be always kept. Further, when the rubber strip S used for each tire constituent portion is wound on each separate adjusting drum, winding can be carried out at the most suitable temperature by using the adjusting drum equipped with the temperature control function when the rubber strip S is wound on the building drum. Therefore, the adjusting drum 2 incorporating a heater or a cooler is preferably employed in the present invention. Because the temperature of the rubber strip S can be much more reduced than when the rubber strip S is directly wound from the extruder 1, the bonding power of the rubber strip S can be improved and at the same time, because the tensile strength of the rubber strip S which becomes lower due to the high temperature at the time of extrusion can be drastically improved, the problem of tear during the winding operation does not occur so easily.

There is a limit to the nozzle opening area of the extruder 1 capable of injection, and when a rubber strip S having a sectional area smaller than this limit is desired to be formed, a strip having a smaller gauge can be produced by winding the wound rubber strip S from the adjusting drum 2 to the building drum 3 at a speed higher than the extruding speed (this is possible because the rubber strip does not easily tear off even when it is wound while being pulled). Consequently, the step between the adjacent rubber strips S can be reduced and eventually, the profile of each tire constituent portion can be shaped with higher accuracy.

Figure 7A:
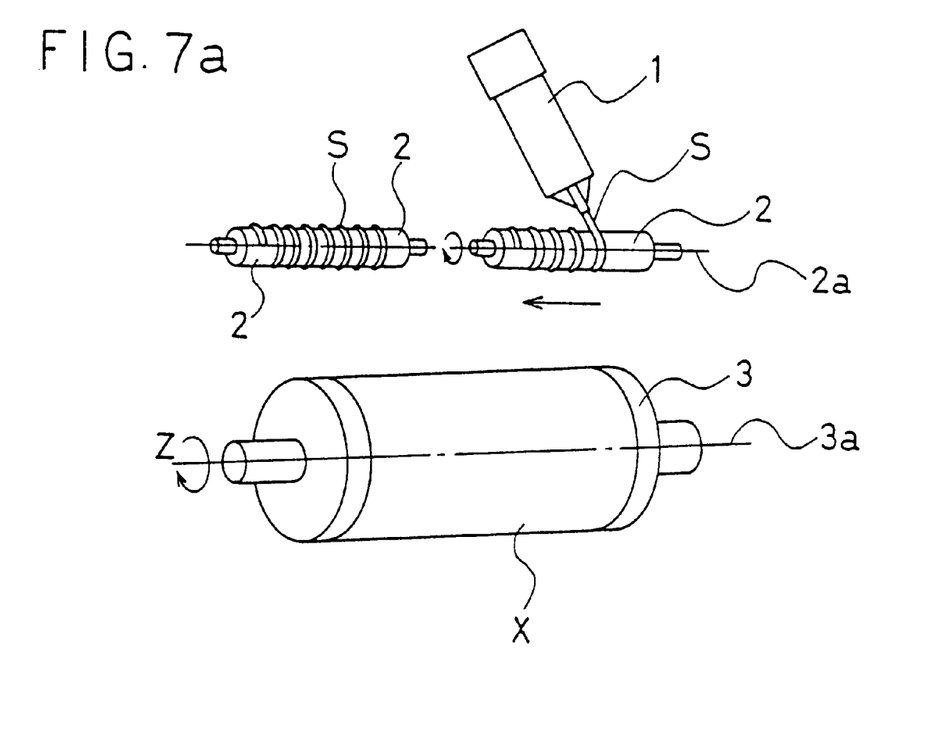
FIG. 7a is a perspective explanatory view showing the step of winding each unvulcanized rubber strip extruded from an extruder onto right and left adjusting drums in another forming method of a green tire according to the present invention.
Figure 7B:
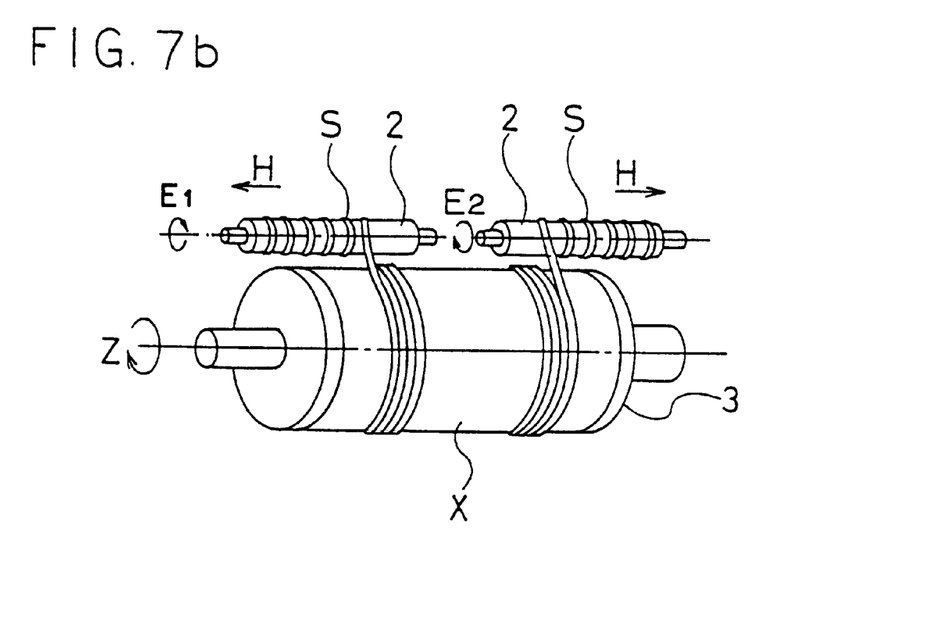
FIG. 7b is a perspective explanatory view showing the step of rewinding simultaneously each rubber strip wound in FIG. 7a from the right and left adjusting drums and winding it onto a tire intermediate body.

FIGS. 7a and 7b show a forming method of a green tire according to another embodiment of the present invention. This embodiment employs right and left two adjusting drums 2 and 2. The rubber strip S extruded continuously from the extruder 1 is helically wound on the adjusting drum 2 on the left side in the length corresponding to the rubber quantity of the tire constituent portion and then the rubber strip S is extruded from the extruder 1 and is similarly wound in the same length on the adjusting drum 2 on the right side.

Next, the end portions of both rubber strips S are unwound at the winding positions on both adjusting drums and are then pressed and bonded to the tire intermediate body X that has already been shaped on the building drum 3. Thereafter, the adjusting drums 2 and 2 and the building drum 3 are rotated synchronously with one another in the directions indicated by the arrows Z, E1 and E2, respectively, in accordance with the extrusion quantities of the rubber strips S. At the same time, the adjusting drums 2 and 2 are moved in the direction indicated by the arrow H, respectively, and the rubber strips S are continuously wound a plurality of times on the tire intermediate body X so as to simultaneously form the right and left tire constituent portions. Consequently, in addition to the effects described above, this embodiment can form simultaneously the tire constituent portions by the right and left adjusting drums 2 and 2 while reducing the number of the expensive extruders 1 to only one, and is therefore advantageous in the reduction of the installation cost and productivity. This forming method can be used advantageously for forming those tire constituent portions which are disposed symmetrically on the right and left sides, such as the side treads 12, the rim cushions 13 and the bead fillers 16 described above.

Figure 8:
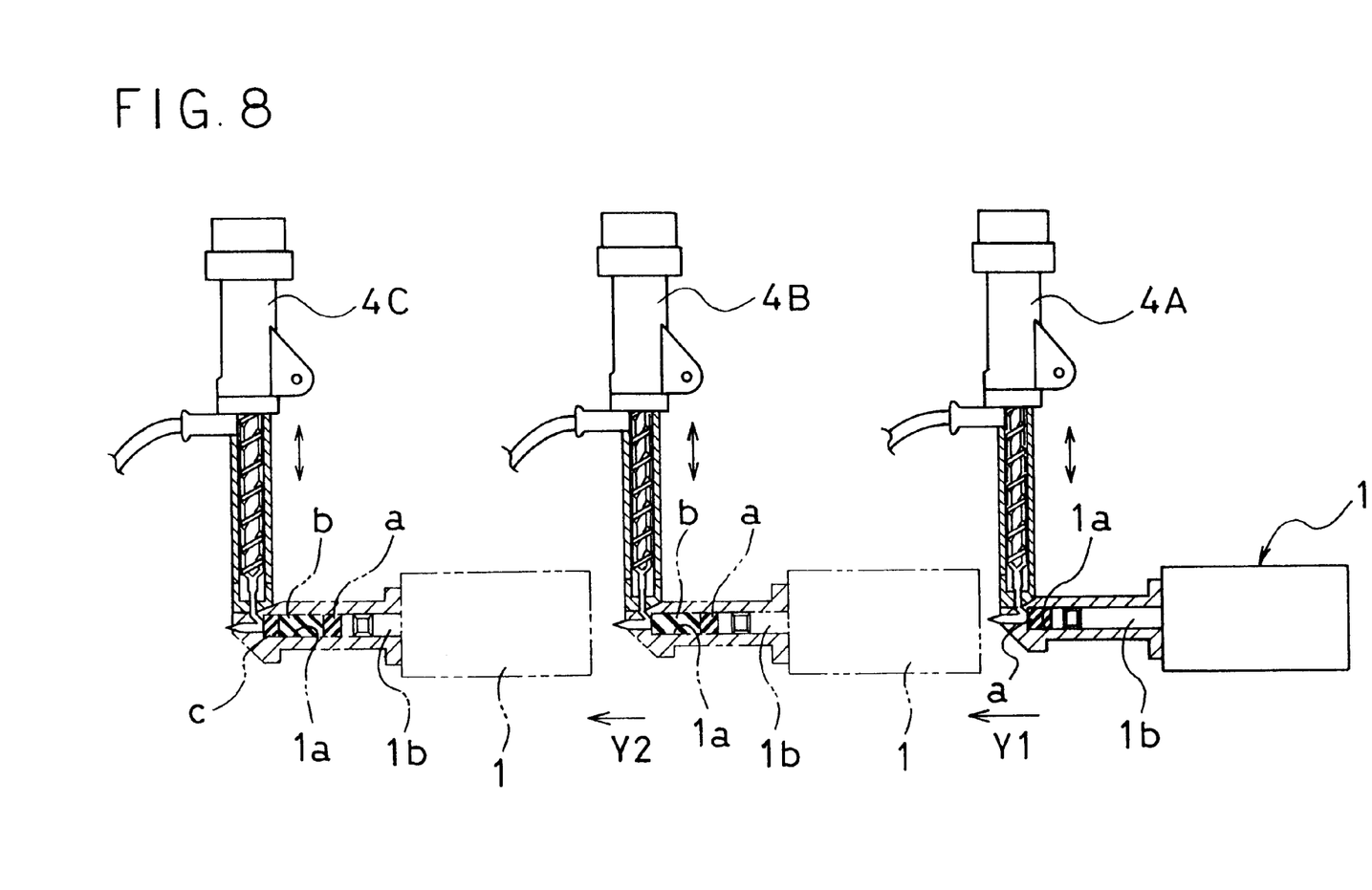
FIG. 8 is an explanatory view showing the step of packing three kinds of unvulcanized rubbers into an extruder in still another forming method of a green tire according to the present invention.

FIG. 8 shows a forming method of a green tire according to still another embodiment of the present invention. This embodiment represents the case where at least two kinds of tire constituent portions made of mutually different kinds of rubbers are continuously shaped, and illustrates a feeding method when three kinds of unvulcanized rubbers are continuously extruded by the extruder 1 so as to continuously form three tire constituent portions. In the drawing, reference numeral 1 denotes the extruder comprising an injection molding machine, and reference numerals 4A, 4B and 4C denote screw type extruders for feeding the unvulcanized rubbers a, b and c to the extruder 1, respectively. The extruder 1 installed below each extruder 4A, 4B and 4C is allowed to advance as indicated by arrows Y1 and Y2 and the unvulcanized rubbers a, b and c are sequentially charged from the extruders 4A, 4B and 4C.

Figure 9:
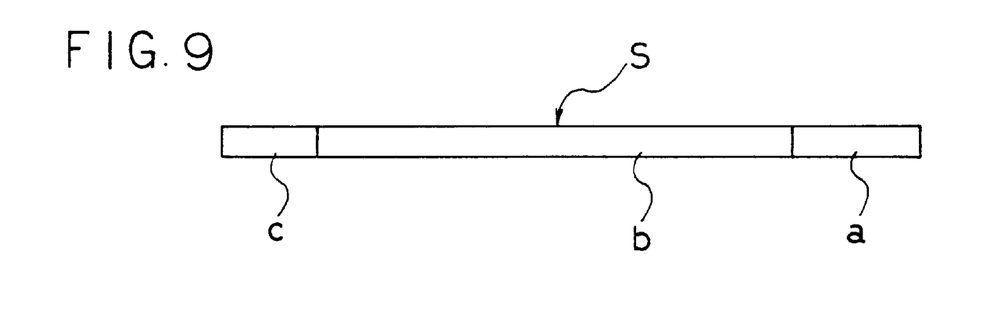
FIG. 9 is an exploded explanatory view of a rubber strip extruded from the extruder shown in FIG. 8.

More concretely, after the unvulcanized rubber a extruded last in the extrusion sequence from the extruder 1 is charged from the extruder 4A into the injection pot 1a, it advances to the feed position of the next extruder 4B as indicated by the arrow Y1. Next, the extruder 4B lowers and the unvulcanized rubber b extruded previously is charged from the extruder 4B into the injection pot 1a. After charging of the unvulcanized rubber b is completed, the extruder 1 further advances as indicated by the arrow Y2 and the unvulcanized rubber c extruded first is charged into the injection pot 1a from the extruder 4C. At this time, the injection pot 1a of the extruder 1 exists under the state where different kinds of unvulcanized rubbers a, b and c in the quantities corresponding to the rubber quantities used for the tire constituent portions are charged in the extrusion sequence for each kind. When these unvulcanized rubbers are extruded by piston 1b, they are sequentially extruded in the belt form without mixing with one another, and one continuous rubber strip S divided for each kind is formed as shown in FIG. 9. Because a plurality of kinds of unvulcanized rubbers a, b and c are charged into the extruder 1 in the extrusion sequence and are sequentially extruded, the rubber strip S can be extrusion-molded efficiently by using one extruder 1. Each extruder that has been necessary for each of the different kinds of the unvulcanized rubbers a, b and c is not necessary any more.

Figure 10:
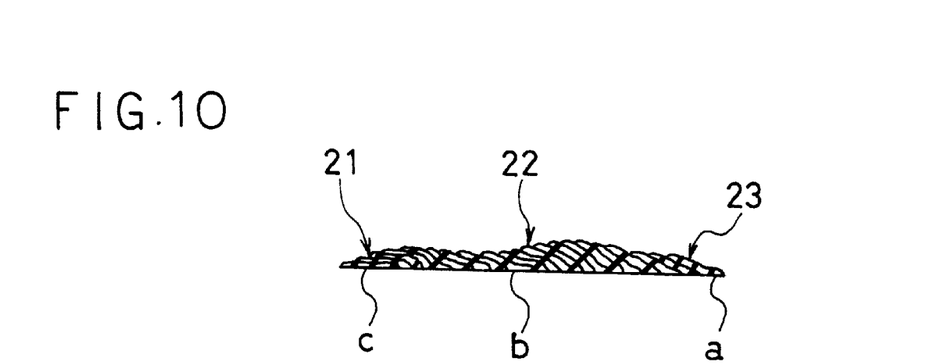
FIG. 10 is a sectional view of principal portions and shows an example of three tire constituent portions, that is, a rim cushion, a side tread and a belt edge cushion on the left side, shaped from the rubber strip shown in FIG. 9.
Figure 11:
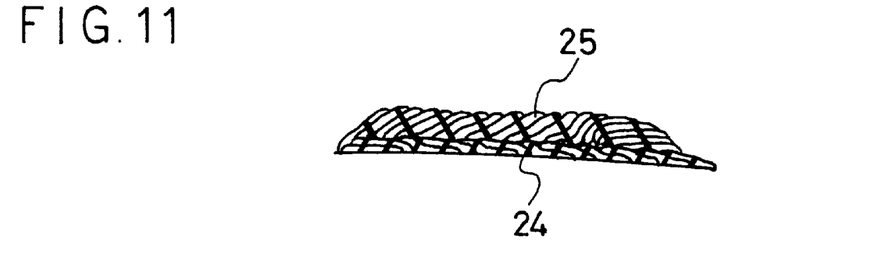
FIG. 11 is a sectional view of principal portions and shows an example of two tire constituent portions, that is, an under-tread and a cap tread, formed from two kinds of rubbers.

The rubber strip S sequentially extruded in this way is wound on the adjusting drum 2 in the same way as in the method shown in FIGS. 1a and 1b and is continuously wound a plurality of times on the tire intermediate body X, and three kinds of tire constituent portions comprising the different kinds of unvulcanized rubbers a, b and c are formed. Preferred examples of the tire constituent portions that can be formed continuously in this way include the three tire constituent portions on the left side shown in FIG. 10 such as the rim cushion 21, the side tread 22 and the belt edge cushion 23 (when they are formed by conventional forming method different from the green tire forming method described above), and the under-tread 24 and the cap tread 25 shown in FIG. 11.

In this embodiment, the extruder 1 is caused to advance and to receive the supply of the unvulcanized rubbers a, b and c but it is also possible to employ the construction wherein the unvulcanized rubbers a, b and c are charged into the extruder 1 by moving the extruders 4A, 4B and 4C towards the extruder 1.

Figure 12:
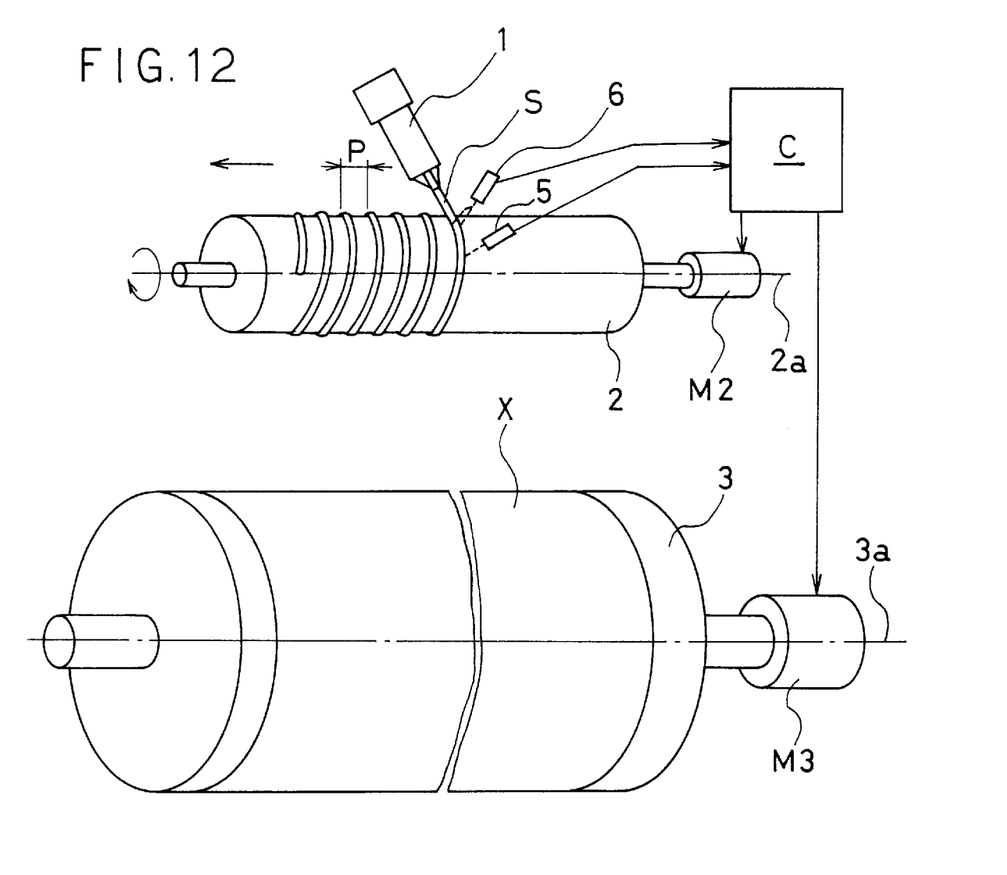
FIG. 12 is an explanatory view showing the step of winding a rubber strip onto an adjusting drum while measuring a size information of the rubber strip.

When the tire constituent portions described above are formed in the present invention, it is preferred to use a thickness detector 5 for detecting the thickness of the rubber strip S, a width detector 6 for detecting the width of the rubber strip S and a computer C for controlling the rotating speeds of the motors M2 and M3 of the adjusting drum 2 and the building drum 3 on the basis of the size information obtained by these detectors 5 and 6, as shown in FIG. 12. The computer C is so constituted as to control the moving speed of the adjusting drum 2 in its axial direction, though the construction is not shown in the drawing.

The detectors 5 and 6 disposed in the proximity of the adjusting drum 2 continuously detect the thickness and the width of the rubber strip S extruded from the extruder 1 when it is wound on the adjusting drum 2 from the winding start point to the winding end point and this information is sequentially sent to the computer C. After this size information is stored in a memory portion of the computer C, the actual sectional area comprising the thickness information and the width information and a predetermined rubber strip sectional area (that is, the required target sectional area when the rubber strip is wound on the building drum), which is obtained from the total rubber quantity of the rubber strip and the necessary winding length are compared and calculated by a calculation portion in the computer C, and their difference information is determined. When the rubber strip S is wound round the outer circumference of the tire intermediate body X, the forming speeds (rotating speeds) of the motors M2 and M3 are controlled in such a manner as to make this difference zero. In this way, the tire constituent portions can be formed with higher accuracy.

In the present invention, the forming speeds of the motors M2 and M3 can be controlled by the computer C by using the length of the rubber strip in place of the sectional area described above. In other words, the actual total length L of the rubber strip S wound on the adjusting drum 2 is calculated by the calculation portion of the computer C in accordance with the formula $L=((\pi D)^2+P^2)^{1/2} \times n$, where D is the diameter of the adjusting drum 2, P is a winding pitch on the adjusting drum 2 (both of these data are inputted in advance), n is the number of times of winding of the rubber strip S (calculated by the formula [Vt/y] in which t (sec) is the extrusion time of the rubber strip S, V (m/sec) the winding speed of the adjusting drum 2 and y (m) the peripheral length of the adjusting drum 2. After this length information is stored in the memory portion, the actual length L and the target total length L' on the building drum are compared and calculated in the calculation portion and their difference information is determined. When the rubber strip S is wound on the outer circumference of the tire intermediate body X, the computer controls the forming speeds (rotating speeds) of the motors M2 and M3 so that this difference becomes zero.

The computer control described above can be effectively employed in the following case, too. Namely, the rubber strip S extruded from the nozzle of the extruder 1 has a high temperature and has an extremely low tensile strength, depending on the kind of the rubber. Therefore, when the rubber strip S is wound on the adjusting drum 2 at an equal speed to the extrusion speed, it is likely to be torn. In such a case, the rubber strip S is wound on the adjusting drum 2 at a winding speed lower than the extrusion speed. The winding speed is given by the following equations:

winding speed=nozzle opening extrusion speed×α, nozzle opening extrusion speed=(injection ram sectional area/nozzle opening area)×injection ram speed, α: winding ratio, $1 > \alpha \geq 0.5$.

The rubber strip S wound in this way becomes thick and wide and its total length becomes small. Since the extrusion quantity becomes unstable at the initial stage and at the last stage of extrusion, the thickness and the width change (that is, both the thickness and the width become greater) when compared with the extrusion portion at the intermediate stage of extrusion). Such a rubber strip S, which is otherwise likely to tear, can be wound efficiently and with high dimensional accuracy by controlling the forming speeds of the motors M2 and M3 by the computer C by using the sectional area information and the length information.

When the rubber strip is wound while being stretched to the target total length on the building drum, for example, the ratio of the rotating speed of the building drum to that of the adjusting drum is given below:

$$R=(L'/L) \cdot (\pi D')/((\pi D)^2+P^2)^{1/2}$$

where D' is the diameter of the building drum.

When the rubber strip is wound while being stretched so as to attain the target sectional area, the ratio R of the rotating speed of the building drum to that of the adjusting drum is given as follows:

$$R=(T \cdot W)/(T' \cdot W')$$

where T is the thickness of the rubber strip on the adjusting drum, W is its width, T' is the thickness of the rubber strip on the building drum and W' is its width.

In the present invention, the extruder 1 in the embodiment shown in FIG. 8 must be constituted by an injection molding machine for continuously extruding a constant quantity but the extruders 1 in the other embodiments are not particularly limited so long as they can continuously extrude the rubber strip S, and may be the injection molding machine or a screw extruding machine.

The present invention can be applied suitably to forming of those thin and narrow tire constituent portions whose dimensional accuracy is greatly affected particularly by the fluctuation of the extrusion quantity, such as the cap tread, the under-tread, the side tread, the bead filler, the rim cushion, and so forth.

As described above, the rubber strip extruded from the extruder is not directly wound on the building drum but is wound up once on the adjusting drum and then wound on the building drum to form the tire constituent portion. Therefore, the extrusion speed of the extruder need not be synchronized with the winding speed of the building drum. As a result, the fluctuation quantity of the rubber strip taken up on the adjusting drum can be known in advance even when the extrusion quantity changes particularly at the start and the end of extrusion of the extruder, and the adjusting drum and the building drum can be rotated synchronously in accordance with the fluctuation. And the rubber strip can be easily wound in such a manner as to follow the peripheral speed which increases as the outer peripheral diameter grows when the tire constituent portion is formed by winding the rubber strip in layers. In consequence, the tire constituent portions can be formed with high dimensional accuracy while keeping high productivity by the strip winding method.

What is claimed is:

1. A method of forming a green tire comprising the steps of:

directly winding a rubber strip formed by simultaneously extruding unvulcanized rubber in a shape of the rubber strip from an extruder onto an adjusting drum in a length corresponding to the rubber quantity of a tire constituent portion, said adjusting drum comprising a straight cylinder having a same diameter in an axial direction thereof, and said rubber strip being spirally wound in a single layer at a predetermined pitch on an outer circumference of said adjusting drum in such a manner as to have adjacent portions of said rubber strip spaced apart from one another so that there is no strip overlap; and forming said tire constituent portion by winding said rubber strip a plurality of times on an outer peripheral side of a rotary support member while unwinding said rubber strip from said adjusting drum.

2. A method of forming a green tire according to claim 1, wherein an axis of rotation of said adjusting drum is disposed in parallel with an axis of rotation of said rotary support member, and said rubber strip is unwound while said adjusting drum is being moved in the direction of the axis of rotation thereof.

3. A method of forming a green tire according to claim 1, wherein, when said rubber strip is wound on said adjusting drum, its dimensional information is obtained and a forming speed for winding said rubber strip on the outer circumference of said rotary support member is controlled on the basis of said dimensional information.

4. A method of forming a green tire according to claim 3, wherein said dimensional information is the thickness and the width of said rubber strip, and said forming speed is controlled so that a sectional area as the product of said thickness and said width equals a target sectional area when said rubber strip is wound on the outer circumference of said rotary support member.

5. A method of forming a green tire according to claim 3, wherein said dimensional information is the length of said rubber strip, and said forming speed is controlled so that the length equals a target length when said rubber strip is wound on the outer circumference of said rotary support member.

6. A method of forming a green tire according to claim 1, wherein said tire constituent portion is at least one member selected from the group consisting of a cap tread, an under-tread, a side tread, a bead filler and a rim cushion.

7. A method of forming a green tire according to claim 1, wherein said extruder is an injection molding machine, and a plurality of kinds of unvulcanized rubbers are charged into said injection molding machine in an extrusion sequence.

8. A method of forming a green tire according to claim 7, wherein an extruder is provided for each of a plurality of kinds of unvulcanized rubbers, and a plurality of kinds of said unvulcanized rubbers are sequentially charged into said injection molding machine from said extruders.

9. A method of forming a green tire according to claim 7, wherein said tire constituent portion made of a plurality of kinds of said unvulcanized rubbers is at least one constituent portion of a constituent portion comprising a cap tread and an under-tread and a constituent portion comprising a rim cushion, a side tread and a bead filler.

* * * * *